Figure 1:
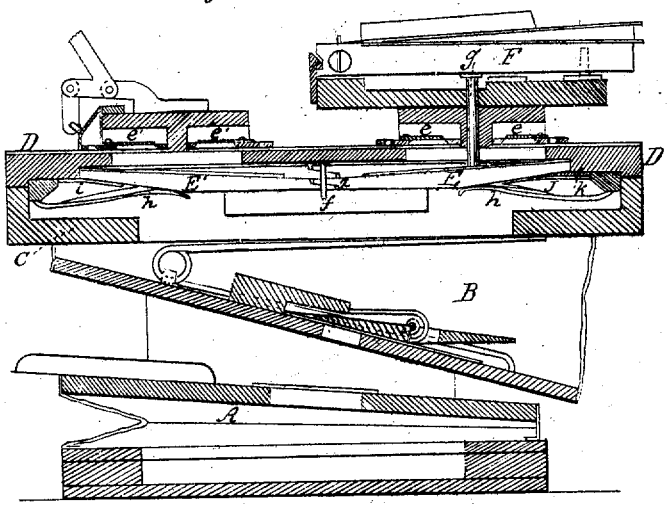
Figure 2:
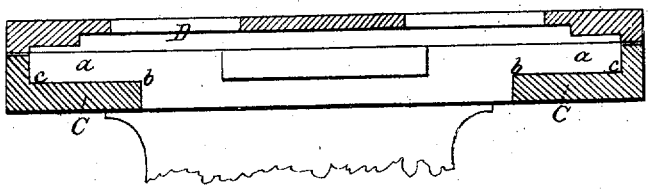
Figure 3:
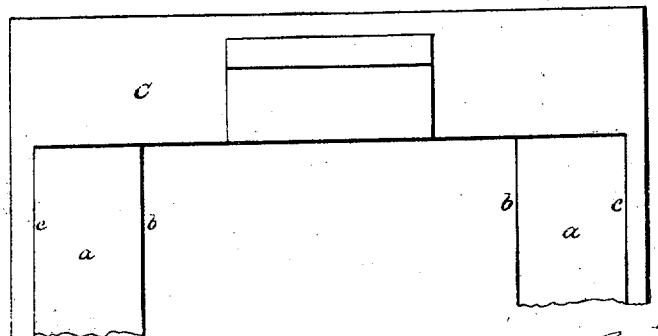

J. A. Rollins,

Impt. in Melodeons,

No. 2330 Reissued Aug. 7, 1866.

Witnesses
James A. Allen
B. F. Mushle

Inventor
Geo. H. Rinoe & Co.
By E. R. W. H. Yorough
Attys

UNITED STATES PATENT OFFICE.

GEORGE A. PRINCE, CHARLES E. BACON, AND CALVIN F. S. THOMAS, OF BUFFALO, NEW YORK, ASSIGNEES OF JOSIAH A. ROLLINS.

IMPROVEMENT IN MELODEONS.

Specification forming part of Letters Patent No. 15,019, dated June 3, 1856; Reissue No. 2,330, dated August 7, 1866.

*To all whom it may concern:*

Be it known that JOSIAH H. ROLLINS, of the city of Buffalo, county of Erie, and State of New York, heretofore invented certain Improvements in Melodeons, for which Letters Patent of the United States were duly granted on the 3d day of June, in the year of our Lord 1856; also, be it known that the said JOSIAH H. ROLLINS has, in due form of law, assigned his whole interest in the said invention and Letters Patent to GEORGE A. PRINCE, CHARLES E. BACON, and CALVIN F. S. THOMAS, of the city of Buffalo aforesaid, composing the firm of GEORGE A. PRINCE & CO.; now, therefore, we, the said GEORGE A. PRINCE, CHARLES E. BACON, and CALVIN F. S. THOMAS, assignees as aforesaid, by virtue of the statute in such case made and provided, do hereby declare that the following is a full, clear, and exact description of the said invention and improvement, reference being had to the accompanying drawings, making a part of this specification, in which—

Figure I is a transverse sectional view of all the principal operating parts of a melodeon embracing the said improvements. Fig. II is a transverse section of the tube-board, and Fig. III is a plan of part of the tube-board.

The nature of this invention relates, first, to placing and arranging within the instrument two or more sets of valves in connection with two, three, or more sets, or parts of sets, of reeds, so that one set of valves will act upon and open another set of valves by the action of one set of keys and one set of push-down pins; second, to the extension of the wind-receiver to the back and front of the case, in order to obtain room under the tube-board to operate two or more sets of valves in connection with two or more sets of reeds; third, to the manner of supporting the front set of valves at their hinges by a strip of wood or other material.

To enable others skilled in the art to make and use said invention, we will herein describe its construction and operation.

Reference-letters of like name and kind refer to like parts of each of the figures.

A represents the bellows; B, the wind-receiver; C, the stationary frame to which the sides of the wind-receiver are attached, and which serves to support the tube-board D.

The above parts are similar to those in common use in melodeons having but one set of valves, except that cavities *a a* are formed in the front and back of the upper side of the frame, by which means the upper part of the wind-receiver is widened on each side to the extent indicated between the lines *b* and *c* in Figs. II and III without necessarily enlarging the frame, the tube-board, or the case. It is extended between the frame C and the tube-board instead of limiting its width by the interior of the frame, (indicated by the lines *b b*,) according to the usual plan. In this way a sufficient width is obtained for two or more sets of valves to work under the tube-board and admit air into two or more sets of reeds.

E represents one set of valves and E′ another set of valves, and *e e* and *e′ e′* two or more sets of reeds arranged above them.

The valves E of the front set are hinged at their front extremities, and the rear set, E′, are hinged at their rear extremities, their moving ends overlapping, as shown at Z, Fig. I, one guide-pin, *f*, serving for the two valves. This mode of fitting each two corresponding valves of two sets enables and permits the valves to be opened by a single-acting key, F, by one push-down pin, *g*. The key acts upon the push-down pin *g*, and the push-down pin acts upon the front valve, and the front valve acts upon the rear valve by overlapping it and pressing it down whenever it is itself pressed down by the key and push-down pin, and thus is developed a principle of construction and arrangement which may be extended to three or more sets of reeds and valves.

It is evident that this invention is not limited to the precise location and arrangement of the valves and reeds as herein particularly described. Any arrangement thereof by which one valve is made to act upon and open another valve is considered as within the principle of this invention.

The valves are furnished with springs *h* of an ordinary kind.

The rear valves are attached to the tube-board by a simple leather hinge, *i*. The front valves, E, are attached by a strip of leather, *j*, and are also supported by a fixed strip of wood, *k*, (see Fig. I,) which extends from end to end of the whole set of valves, and serves as a kind of shelf for their ends to rest upon. This strip is necessary for the support of the front valves, because the whole of the resistance of the corresponding rear valves is transmitted to act in a downward direction on the hinges of the front valves, and leather hinges alone would not be sufficient to bear it.

The pressure on the hinges of the rear valves is in an upward direction, as in ordinary melodeons, and therefore require no additional support.

What we claim as the invention of the said JOSIAH H. ROLLINS, and desire to secure by these Letters Patent, is—

1. Placing and arranging within a melodeon or other like reed musical instrument two or more sets of valves in connection with two, three, or more sets, or parts of sets, of reeds, so that one set of valves will act upon and open another set of valves by the action of one set of keys and one set of push-down pins, substantially as described.

2. Supporting the front set of valves by a strip of wood, *k*, or other equivalent, for the purpose and substantially as described.

GEO. A. PRINCE.
CHAS. E. BACON.
C. F. S. THOMAS.

Witnesses:
LOUIS BOUSH,
E. B. FORBUSH.